(12) United States Patent
Hosoda et al.

(10) Patent No.: US 7,269,154 B2
(45) Date of Patent: Sep. 11, 2007

(54) WIRELESS LAN SYSTEM FOR PREDICTING MOVEMENT DESTINATION OF CHILD STATION AND WIRELESS LAN PARENT STATION THEREFOR

(75) Inventors: Hironori Hosoda, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 728 days.

(21) Appl. No.: 10/721,283

(22) Filed: Nov. 26, 2003

(65) Prior Publication Data

US 2004/0105417 A1 Jun. 3, 2004

(30) Foreign Application Priority Data

Nov. 28, 2002 (JP) .............................. 2002-345849

(51) Int. Cl.
*H04Q 7/24* (2006.01)
*H04Q 7/20* (2006.01)

(52) U.S. Cl. ....................................... 370/338; 455/432

(58) Field of Classification Search ................ 370/338, 370/331; 455/432
See application file for complete search history.

(56) References Cited

U.S. PATENT DOCUMENTS 5,796,727 A * 8/1998 Harrison et al. ............. 370/338
6,473,413 B1 * 10/2002 Chiou et al. ................. 370/331
2002/0131386 A1 * 9/2002 Gwon ......................... 370/338

FOREIGN PATENT DOCUMENTS

| JP | 08-037680 | 2/1996 |
|---|---|---|
| JP | 09-046753 | 2/1997 |
| JP | 09-252480 | 9/1997 |
| JP | 2000-295649 | 10/2000 |
| JP | 2001-103531 | 4/2001 |
| JP | 2001-134541 | 5/2001 |
| JP | 2001-169325 | 6/2001 |
| JP | 2001-238245 | 8/2001 |

OTHER PUBLICATIONS

Japanese Office Action dated Jan. 16, 2006 with English translation of pertinent portions.

* cited by examiner

*Primary Examiner*—Joseph Feild
*Assistant Examiner*—Kiet Doan
(74) *Attorney, Agent, or Firm*—Whitham Curtis Christofferson & Cook, PC

(57) ABSTRACT

In the wireless LAN system including the child station and parent stations, when each parent station detects handover of the child station during QoS communication through a wireless communication section, a table control section acquires the table where MAC addresses of movement destination parent stations have been registered and the band reserving request signal transmitting section transmits the band reserving request frame to the parent stations through a LAN communication section via Ethernet. The table control section includes a registering means which registers the acquired table, a deleting means which deletes the table and a managing means which updates and manages the table.

11 Claims, 8 Drawing Sheets

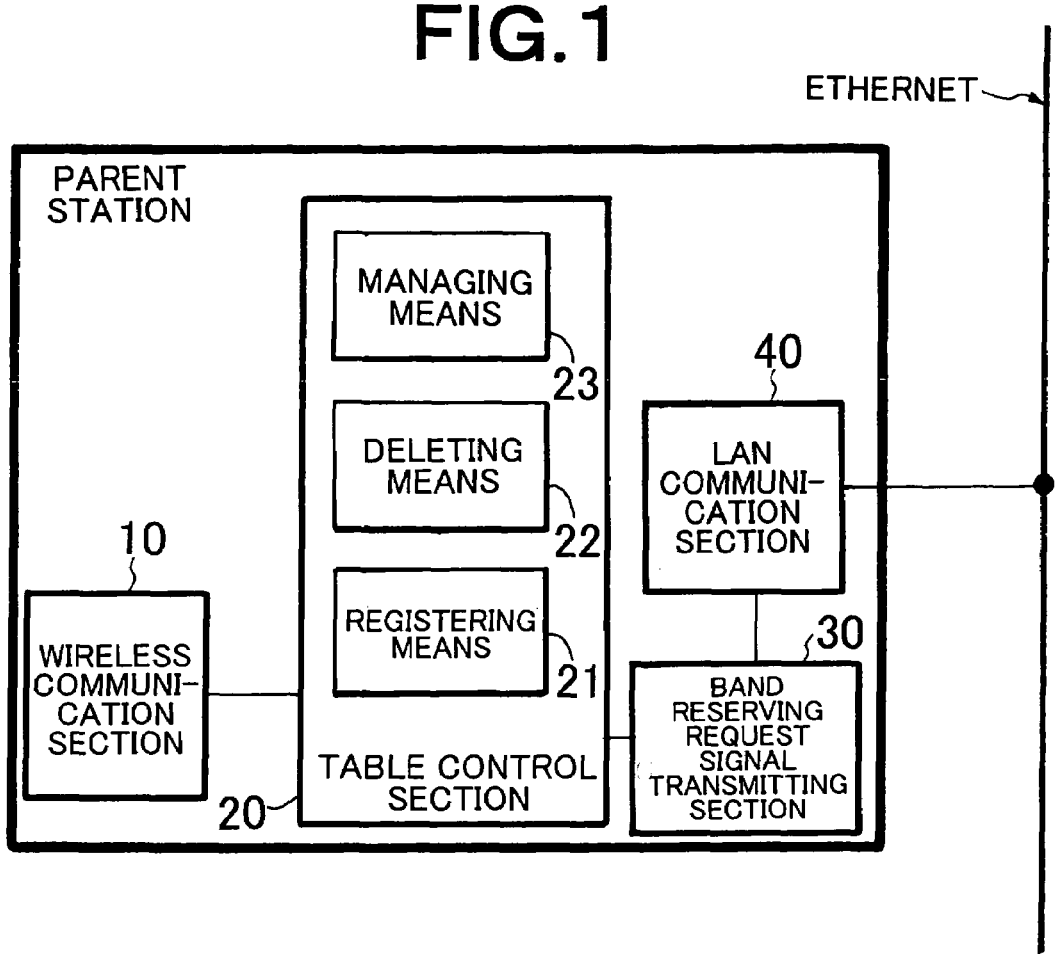

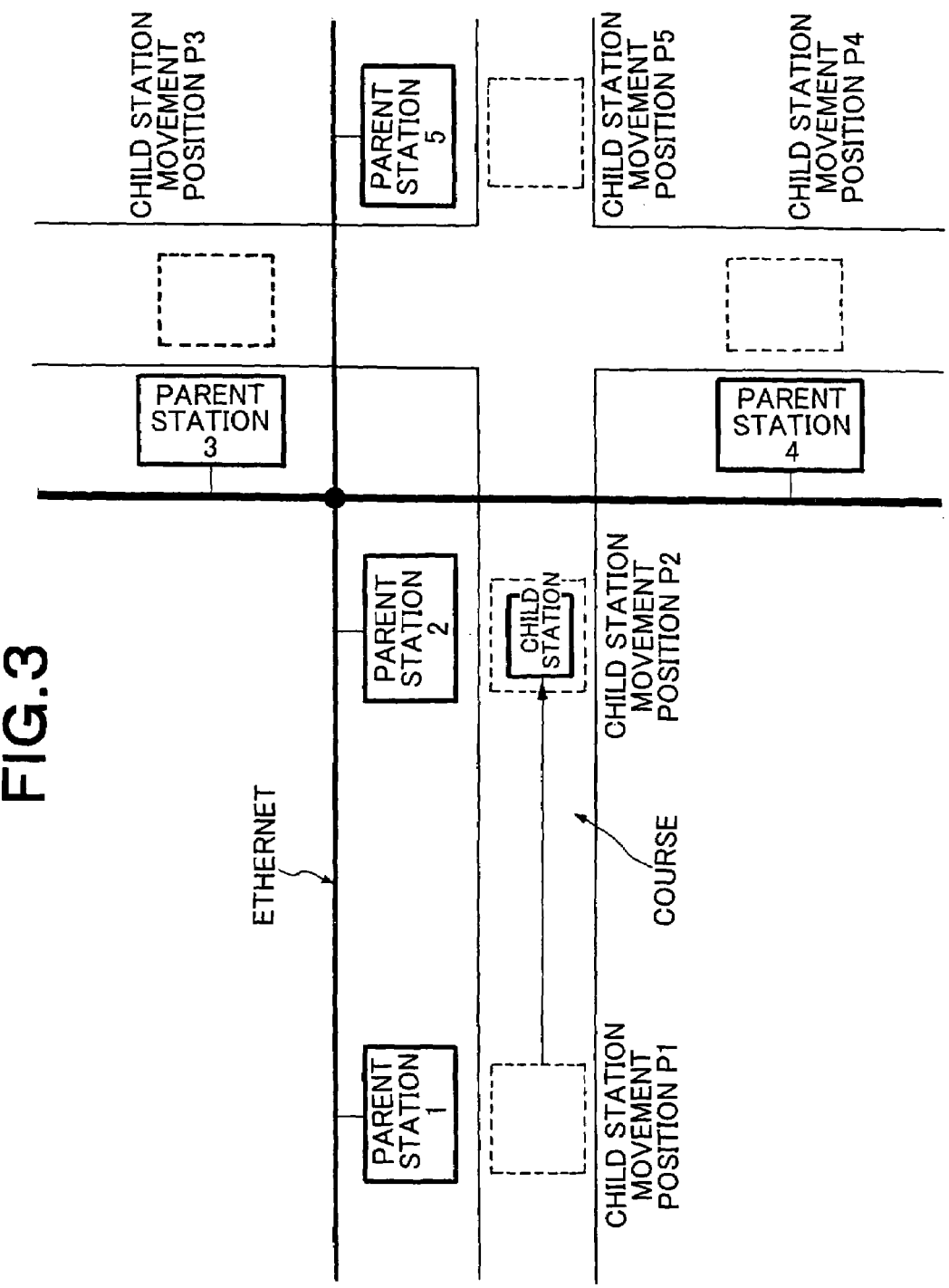

| REGISTERED PARENT STATION MAC ADDRESSES | RSSI |
|---|---|
| DDDDDD (PARENT STATION 4) | 70 |
| CCCCCC (PARENT STATION 3) | 65 |
| AAAAAA (PARENT STATION 1) | 63 |
| EEEEEE (PARENT STATION 5) | 58 |

FIG.11

| REGISTERED PARENT STATION MAC ADDRESSES | PERCENTAGE OF MOVEMENT DESTINATION AT PARENT STATION POSITION 1 (%) | PERCENTAGE OF MOVEMENT DESTINATION AT PARENT STATION POSITION 3 (%) | PERCENTAGE OF MOVEMENT DESTINATION AT PARENT STATION POSITION 4 (%) | PERCENTAGE OF MOVEMENT DESTINATION AT PARENT STATION POSITION 5 (%) |
|---|---|---|---|---|
| AAAAAA (PARENT STATION: 1) | 5 | 7 | 66 | 27 |
| CCCCCC (PARENT STATION: 3) | 15 | 2 | 13 | 12 |
| DDDDDD (PARENT STATION: 4) | 20 | 13 | 11 | 58 |
| EEEEEE (PARENT STATION: 5) | 60 | 78 | 10 | 3 |

WIRELESS LAN SYSTEM FOR PREDICTING MOVEMENT DESTINATION OF CHILD STATION AND WIRELESS LAN PARENT STATION THEREFOR

BACKGROUND OF THE INVENTION

1. Field of the Invention

The present invention relates to a flow prediction QoS (Quality of Service) control, and in particular to a wireless LAN system for predicting movement destination of a child station for reserving a band required for QoS control in advance.

2. Description of the Related Art

In the wireless LAN system, conventionally, when the child station moves to conduct handover, a parent station which is a roaming destination must reserve the band required for QoS communication. Therefore, it has been difficult to conduct real time QoS control at a time of handover.

Further, in Japanese Patent Publication No. 2001-103531 A, there has been disclosed a wireless LAN base station selecting system constituted so as to notify a mobile terminal moving between wireless LAN base stations of base station information whose contents are ranked in the order of higher probability of movement of the terminal utilizing information obtained statistically from movement information of the mobile terminal to conduct switching to another base station efficiently.

However, conventionally, as movement of the child station, it takes much time for the parent station which is a roaming destination to reserve the band required for QoS communication, which results in deterioration of a real time property of communication.

SUMMARY OF THE INVENTION

Therefore, an object of the present invention is to provide the wireless LAN system for predicting movement destination of the child station where the parent station which has detected handover of the child station causes another parent station which is predicted as the next roaming destination to reserve the band required for controlling QoS communication so that communication whose real time property is not negatively affected can be achieved even while the child station is moving in a broad range.

In order to solve the above-described problem, according to the present invention, there is provided the wireless LAN system for predicting movement destination of a child station, which includes the child station and parent stations, wherein each parent station comprises: a wireless communication section which conducts communication with the child station, a table control section which acquires a table in which MAC address of each movement destination parent station has been registered when handover of the child station put under QoS communication is detected through the wireless communication section; the band reserving request signal transmitting section which transmits a transmission instruction of the band reserving request frame to the movement destination parent station; and a LAN communication section which receives the transmission instruction and transmits the band reserving request frame to the movement destination parent station via LAN.

With the above constitution, it is made possible to cause the parent station which is predicted to be the next movement destination to reserve a band prior to handover of the child station.

As described above, according to the present invention, since the parent station which is predicted to be the next movement destination to reserve a band prior to handover of the child station, a loss time required for reserving the band required for the QoS control can be avoided in advance.

BRIEF DESCRIPTION OF THE DRAWINGS

FIG. 1 is a basic configuration diagram of the parent station according to the present invention;

FIG. 2 is an explanatory diagram of the table in which a MAC address of a movement destination parent station has been registered;

FIG. 3 is a configuration diagram of the wireless LAN system in a first embodiment;

FIG. 11 is a diagram showing information about predicted movement destination of the child station stored in the table control section of the parent station in the fourth embodiment.

DESCRIPTION OF THE PREFERRED EMBODIMENTS

Figure 4:
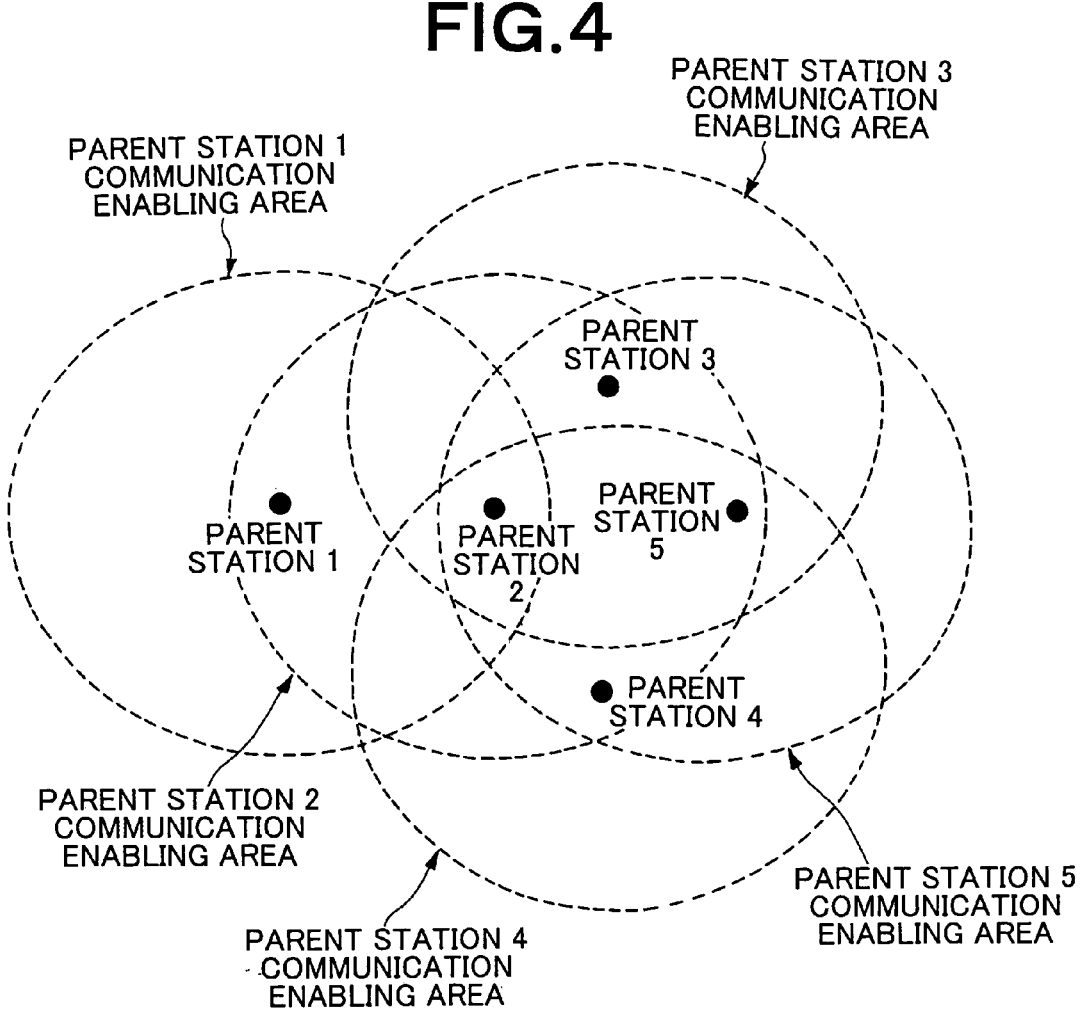
FIG. 4 is a diagram showing a communication enabling area of adjacent parent stations in the first embodiment.

Next, embodiments of the present invention will be explained with reference to the drawings.

FIG. 1 shows one example of a basic configuration of the parent station according to the present invention. When the parent station detects handover of the child station put under QoS communication via wireless communication section 10, table control section 20 acquires the table in which MAC addresses of movement destination parent stations have been registered, such as shown in FIG. 2, and the band reserving request signal transmitting section 30 transmits the band reserving request frame to the parent stations through LAN communication section 40 via Ethernet (registered trademark® of Xerox Co., Ltd). The table control section 20 includes registering means 21 which registers an acquired table, deleting means 22 which deletes the table and managing means 23 which updates and manages the registered table.

Since the parent station which is predicted to be the movement destination is caused to reserve the band prior to handover of the child station, a time loss required for such a processing can be avoided in advance.

Figures 5, 6:
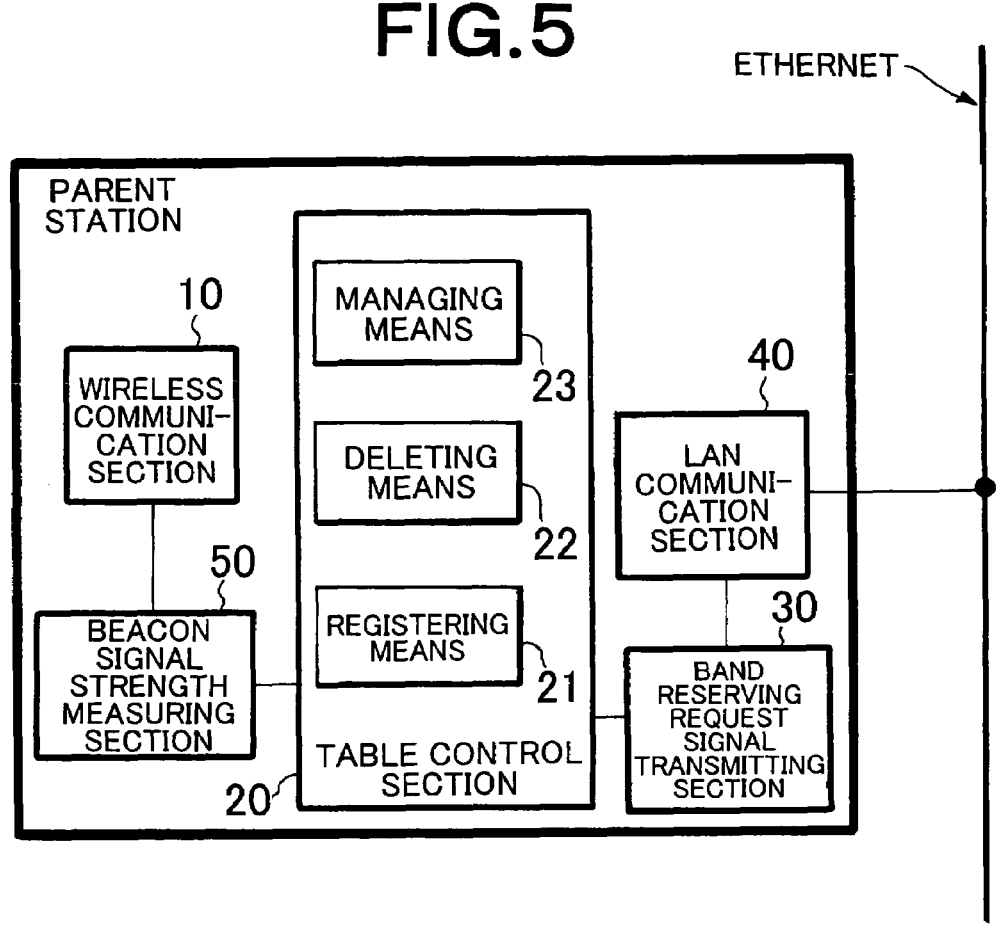
FIG. 5 is a configuration diagram of the parent station in the first embodiment.
FIG. 6 is a diagram showing information about movement destination parent station addresses stored in the table control section of the parent station in the first embodiment.

FIGS. 3 to 5 show a configuration of the wireless LAN system, and a communication enabling area obtained by the configuration and a configuration of the parent station.

In a system configuration shown in FIG. 3, it is assumed that the child station movement positions P1 to P5 are positioned on courses just below parent stations 1 to 5, and the child station can freely move to these positions. Further, it is assumed that, since a communication enabling range of each parent station is disposed so as to overlap with respective communication enabling areas of adjacent parent stations, such as shown in FIG. 4, each parent station can receive beacon signals from the adjacent parent stations.

FIG. 5 shows a configuration of the parent station of this embodiment. Beacon signal strength measuring section 50 quantifies the strength of an interception signal from each adjacent parent station with RSSI (Receive Signal strength Indication). The table control section inputted with information about the strength selects only the parent station which transmits a signal with a predetermined value or more and registers the same so that the table can be processed as movement destination position parent station information to which the child station may move.

For this reason, in the wireless LAN system according to this embodiment, when the child station has been moved from the movement position P1 to the movement position P2, the parent station 2 can transmit the band reserving request frame to each of the parent stations 1, 3, 4 and 5, which is predicted as one movement destination, on the basis of the movement destination position parent station information (refer to FIG. 6).

Incidentally, the wireless LAN system of this embodiment has such a feature that, since a movement prediction table is produced on the basis of the strengths of interception signals, it is unnecessary to input information about the parent station positions into the table control section manually, and the contents of the table can be updated automatically even when the arrangement constitution of the parent station is modified.

Figure 7:
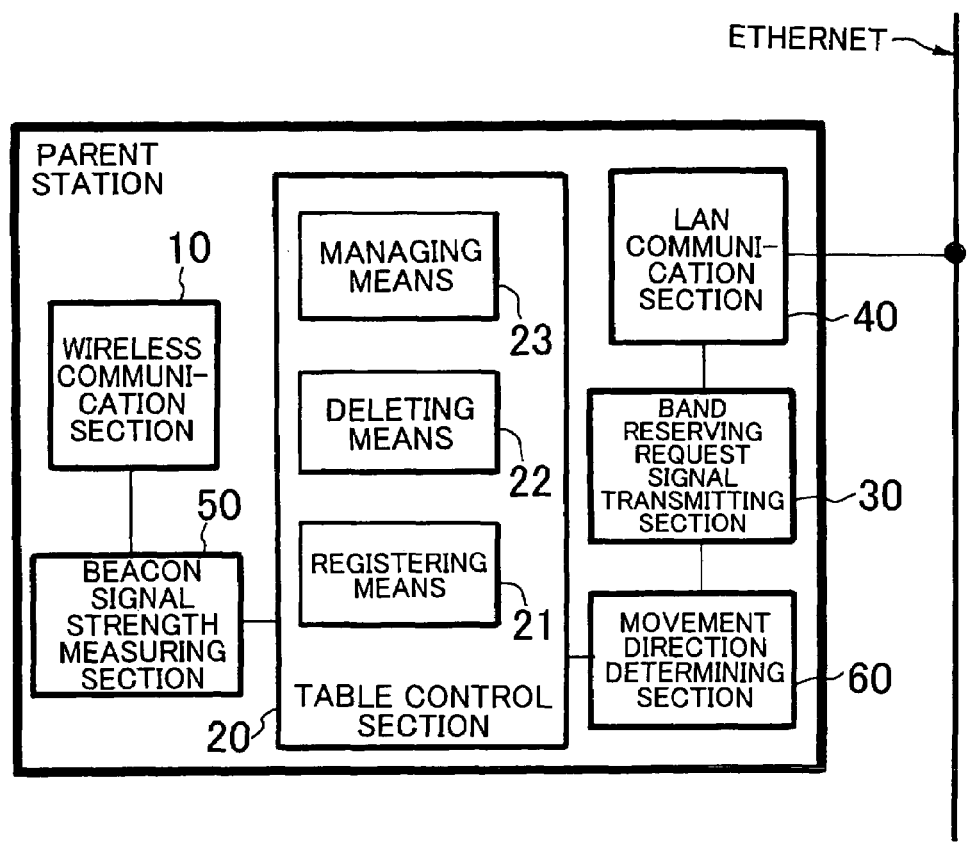
FIG. 7 is a configuration diagram of the parent station in a second embodiment.

FIG. 7 is shows a configuration of the parent station in a second embodiment of the present invention. Incidentally, a configuration and a communication enabling area of the wireless LAN system in this embodiment are the same as those in the first embodiment.

The parent station of this embodiment is constituted to conduct perform functions such that the information about movement destination parent stations is registered in the table control section in the same manner as the first embodiment. However, the parent station of this embodiment has a function that, when the band reserving request frame is transmitted to each parent station registered in the table, a movement direction determination section 60 compares MAC addresses of the parent stations existing in the movement source and the movement destination with each other and it can nullify a transmission request of the reserving request to the band reserving request signal transmitting section 30 when the MAC addresses are the same.

For this reason, in the wireless LAN system of this embodiment, when the child station is moved from the movement position P1 to the movement position P2, the movement destination predicted from the movement destination parent station position table of the parent station 2 will be the one of the parent stations 1, 3, 4 and 5 (refer to FIG. 6), however, a band reserving request frame is eventually transmitted to the parent stations 3, 4 and 5.

The wireless LAN system of this embodiment has an advantage that an unnecessary band use can be avoided in a place where a movement aspect in which a person carrying the child station returns is hardly considered, such as a corridor.

Figure 8:
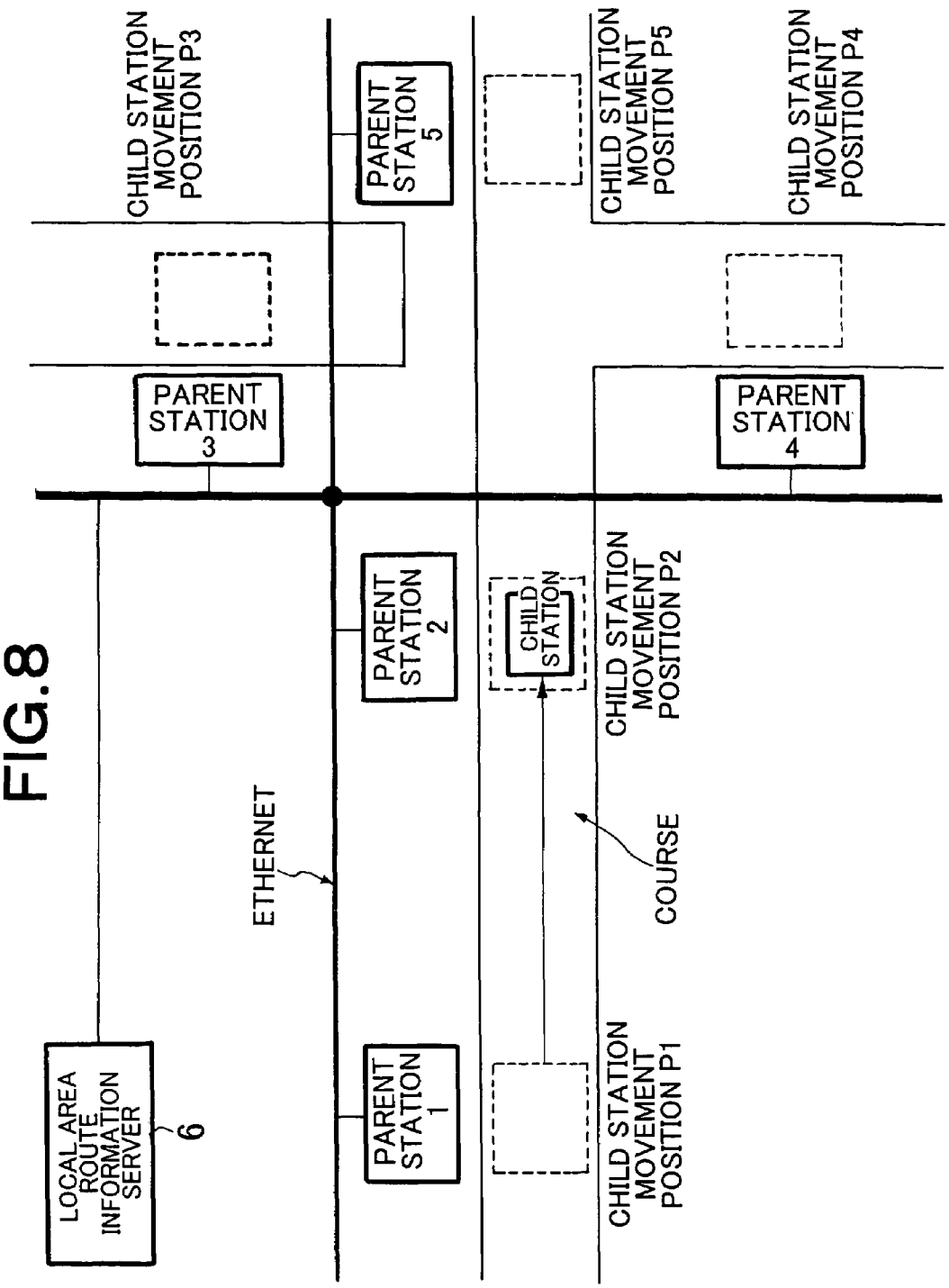
FIG. 8 is a configuration diagram of the wireless LAN system in a third embodiment.
Figure 9:
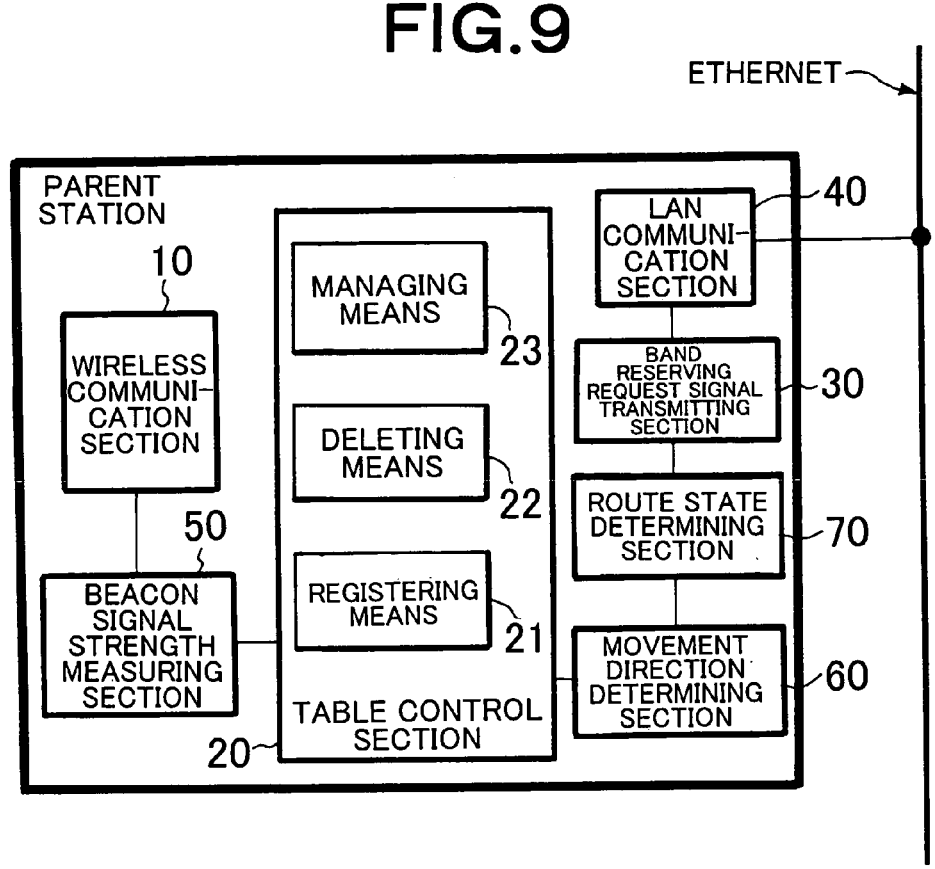
FIG. 9 is a configuration diagram of the parent station in the third embodiment.

FIGS. 8 and 9 show a configuration of the wireless LAN system and a configuration of the parent station in a third embodiment of the present invention. Incidentally, it is assumed that a communication enabling area of this embodiment is the same as that in the first embodiment.

It is assumed that, since the system configuration of the third embodiment is constituted such that a course with a T shape is used instead of the course (FIG. 3) with a cross shape, the child station can not move directly to the child station movement position 3. A local area route information server 6 for providing route information in an institution to each parent station exists on the Ethernet.

Information from the route information server 6 is stored in route state determining section 70 shown in FIG. 9 where the information is used as material for determining a direction in which the child station can not move directly. For this reason, in the wireless LAN system of this embodiment, when the child station is moved from the movement position P1 to the movement position P2, the movement destination which is predicted from the movement destination parent station position table in the parent station 2 includes the parent stations 1, 3, 4 and 5 (refer to FIG. 6). However, since the band reserving request to the parent station 1 is rejected by the movement direction determining section 60 and the band reserving request to the parent station 3 is rejected by the route state determining section 70, the band reserving request frame is finally transmitted to only the parent stations 4 and 5.

Since the wireless LAN system of this embodiment does not transmit the band reserving request to the parent station to which the child station can not actually move on the basis of the route information provided from the server, more efficient band use can be expected as compared with the foregoing embodiments.

Figure 10:
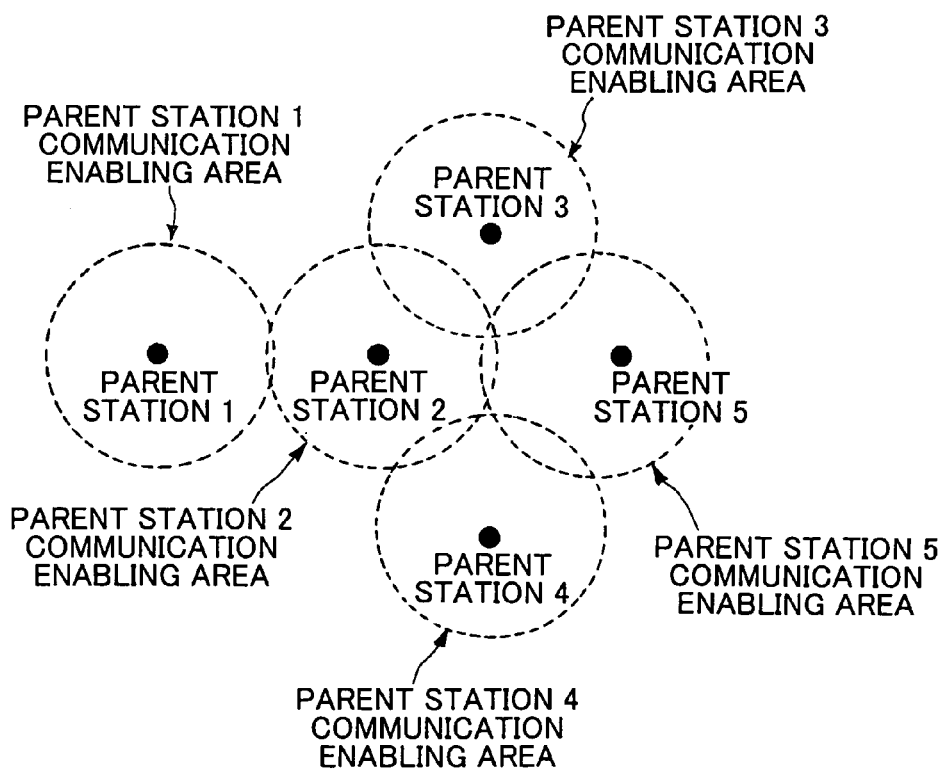
FIG. 10 is a diagram showing communication enabling area of adjacent parent stations in a fourth embodiment.

A fourth embodiment of the present invention has the same configuration as the first embodiment regarding the wireless LAN system and the parent station (FIGS. 3 and 5). Incidentally, as shown in FIG. 10, it is assumed that, since each parent station does not cover communication areas of parent stations adjacent thereto, the movement destination parent station position information can not be acquired from interception signals.

A table control section of the parent station which has detected handover of the child station during QoS communication counts the number of movement times for each aspect of a movement source per movement destination from association setting information at a time of handover to calculate a movement destination ratio.

As a result, the table control section of the parent station 2 in the wireless LAN system of this embodiment eventually has the movement destination predicting information of the child station such as shown in FIG. 11. For example, when the child station is moved from the movement position P1 to the movement position P2, the band reserving request frame is eventually transmitted to the parent station 5 with the highest movement probability selected from the table.

In the wireless LAN system of this embodiment, the frequency or the number of movement times must be sampled to some extent in order to improve accuracy of the movement prediction, however, realization can be made possible without interception of adjacent station signals or preparing a map server like the above embodiments.

What is claimed is:

1. A wireless LAN system for predicting movement destination of a child station, which includes the child station and a plurality of parent stations, wherein each of said parent stations has a MAC address and comprises:

a wireless communication section for conducting communication with the child station, the communication including detecting a handover of said child station from said parent station;

a table control section acquiring a table having the MAC address of each said parent stations that, relative to said parent station, can be a movement destination parent station registered, in response to said wireless communication section detecting the handover of the child station;

a band reserving request signal transmitting section for generating a transmission instruction for transmitting a band reserving request frame to all of said plurality of movement parent stations having their respective MAC address registered in said table movement destination parent station; and a LAN communication section for receiving the transmission instruction and transmitting the band reserving request frame to the movement destination parent stations via LAN, further comprising:

a local area route information server for providing a route information to each of said parent stations, said route information representing a direction that a child station cannot be moved in relation to said parent station, wherein said parent station further comprises a route state determining section for receiving and storing the route information and, based on said stored route information, nullifying a transmission instruction for transmitting a band reserving reguest to the parent station positioned in the direction in which the child station can not be moved.

2. The wireless LAN system according to claim 1, wherein each of said parent stations further comprises:

a transmitter for transmitting a beacon signal identifying said parent station;

a signal strength measuring section for receiving and quantifying a beacon signal of at least one adjacent parent station of the parent stations, wherein said table control section receives information of the qualified beacon signal and produces the table obtained by selecting and registering only the parent stations which generates a signal with a constant value or more, and when the child station is moved, the band reserving request frame is transmitted to the parent station which is predicted as the movement destination on the basis of the movement destination parent station position information which the table control section has.

3. The wireless LAN system for predicting movement destination of a child according to claim 2, wherein said parent station further comprises a movement direction determining section for comparing MAC addresses of the parent stations existing in a movement source and the movement destination of the child station with each other, and for nullifying the transmission instruction of the reserving request to the band reserving request signal transmitting section, when the MAC addresses are the same.

4. The system according to claim 2, further comprising a local area route information server for providing a route information to each of said parent stations, said route information representing a direction that a child station cannot be moved in relation to said parent station, wherein said parent station further comprises a route state determining section for receiving and storing the route information and, based on said stored route information, nullifying a transmission instruction for transmitting a band reserving request to the parent station positioned in the direction in which the child station can not be moved.

5. The system according to claim 2, wherein said table control section counts the number of movement times of the child station per movement destination to produce the table to represent the probability of each of the parent stations being the movement destination of the child station, and instructs to transmit the band reserving request frame to the parent station with the highest movement probability of the table.

6. The wireless LAN system for predicting movement destination of a child according to claim 1, wherein said parent station further comprises a movement direction determining section for comparing MAC addresses of the parent stations existing in a movement source and the movement destination of the child station with each other, and for nullifying the transmission instruction of the reserving request to the band reserving request signal transmitting section, when the MAC addresses are the same.

7. The system according to claim 6, further comprising a local area route information server for providing a route information to each of said parent stations, said route information representing a direction that a child station cannot be moved in relation to said parent station, wherein said parent station further comprises a route state determining section for receiving and storing the route information and, based on said stored route information, nullifying a transmission instruction for transmitting a band reserving request to the parent station positioned in the direction in which the child station can not be moved.

8. The system according to claim 6, wherein said table control section counts the number of movement times of the child station per movement destination to produce the table to represent the probability of each of the parent stations being the movement destination of the child station, and instructs to transmit the band reserving request frame to the parent station with the highest movement probability of the table.

9. The system according to claim 1, wherein said table control section counts the number of movement times of the child station per movement destination to produce the table to represent the probability of each of the parent stations being the movement destination of the child station, and instructs to transmit the band reserving request frame to the parent station with the highest movement probability of the table.

10. The wireless LAN system for predicting movement destination of a child according to claim 1, wherein said table control section counts the number of movement times of the child station for each aspect of movement source per movement destination from association setting information at a handover time to produce the table obtained by calculating movement destination ratios of the child station, and instructs to transmit the band reserving request frame to the parent station with the highest movement probability of the table.

11. A wireless LAN parent station for predicting movement destination of a child station, comprising:

a wireless communication section for conducting communication with the child station, the communication including detecting a handover of said child station from said parent station;

a table control section for acquiring a table having the MAC address of each said parent stations that, relative to said parent station, can be a movement destination parent station registered, in response to said wireless communication section detecting the handover of the child station;

a band reserving request signal transmitting section for generating a transmission instruction for transmitting a band reserving request frame to all of said plurality of movement parent stations having their respective MAC address registered in said table movement destination parent station; and a LAN communication section for receiving the transmission instruction and transmitting the band reserving request frame to the movement destination parent stations via LAN, further comprising:

a local area route information server for providing a route information to each of said parent stations, said route information representing a direction that a child station cannot be moved in relation to said parent station, wherein said parent station further comprises a route state determining section for receiving and storing the route information and, based on said stored route information, nullifying a transmission instruction for transmitting a band reserving request to the parent station positioned in the direction in which the child station can not be moved.

* * * * *